United States Patent [19]
Venters et al.

[11] Patent Number: 5,579,316
[45] Date of Patent: Nov. 26, 1996

[54] COMMUNICATIONS TECHNIQUE FOR TRANSMITTING LIMITED SIZE DIGITAL DATA FRAMES USING MACRO HEADERS TO REPRESENT MULTIPLE HEADER CODE PATTERNS ASSOCIATED WITH ENCAPSULATION PROTOCOLS AND SIGNAL PROCESSING OPERATIONS TO WHICH TRANSMITTED DATA ARE SUBJECTED

[75] Inventors: W. Stuart Venters; Kevin W. Schneider, both of Huntsville, Ala.

[73] Assignee: Adtran, Huntsville, Ala.

[21] Appl. No.: 237,355

[22] Filed: May 2, 1994

[51] Int. Cl.$^6$ .................................................. H04J 3/00
[52] U.S. Cl. ......................... 370/94.1; 370/118; 375/241
[58] Field of Search ................................. 370/79, 80, 83, 370/7, 109, 118; 375/5, 121, 122, 240, 241, 377; 455/74, 142, 72; 395/200, 325

[56] References Cited

U.S. PATENT DOCUMENTS

| | | | |
|---|---|---|---|
| 4,839,906 | 6/1989 | Leveque et al. | 455/72 |
| 5,130,993 | 7/1992 | Gutman et al. | 371/42 |
| 5,151,923 | 9/1992 | Fujiwara | 455/79 |
| 5,185,866 | 2/1993 | Francisco | 395/325 |
| 5,222,081 | 6/1993 | Lewis et al. | 375/121 |
| 5,245,614 | 9/1993 | Gutman et al. | 370/118 |
| 5,323,398 | 6/1994 | Wake et al. | 370/110.1 |

*Primary Examiner*—Benedict V. Safourek
*Attorney, Agent, or Firm*—Charles E. Wands

[57] ABSTRACT

Network bit efficiency for transmitting a limited size data frame over a digital communication system is enhanced by a macro-header encoding mechanism which replaces plural header portions of a data frame sequence with a single macro-header byte. The macro-header may be representative of protocol and signal processing operation fields that would otherwise require a longer overhead sequence as a precursor to data transmission. At the receiver, the macro-code is translated into a predefined sequence of opcodes, parameters and data bytes. Whenever the receiver requires another opcode, parameter or data byte, it initially looks to the macro-code. Otherwise, the necessary byte is obtained from the data frame segment being interpreted. Within a frame of data a multi-bit parameter header includes a first bit indicating whether the message is being aborted, a second bit indicating whether the frame is the first frame in the message, a third bit indicating whether the frame is the last frame in the message, a fourth bit indicating whether a sequence number follows, a fifth bit indicating whether the frame contains data representative of the length of the frame, a sixth bit indicating whether the frame contains data, a seventh bit indicating whether the frame contains frame check sequence signals, and an eighth bit indicating whether immediately following is an extension parameter header.

33 Claims, 12 Drawing Sheets

MACRO TABLE

| TAG | VALUE |
|---|---|
| PID | FD |
| PID | 9B |
| PARAMETER FOR PID 9B | 4B |
| END | N/A |

```
/* sample C receiver to decode frames shown in figures 3 thru 12 */
/* some extra details removed for brevity */ define MLT_PID                 0
define MLT_PARAM               1
#define MLT_DATA                2
#define MLT_END                 3
#define MLT_FIRST               0x0100
#define MLT_SECOND              0x0200
#define MLT_THIRD               0x0300
define MLT_FORTH               0x0400 struct MacroLine  {
    UINT32   For;
    UINT16   Tag;
    UINT32   Value;

};

#define PID_COMPRESS    0x00fd
#define    STAC_SEQ MLT_PARAM | MLT_FIRST
#define STAC_DCOMP_MAX       12000
define STAC_RST_REQ_TIME    3000 struct StacControl  {
    BYTE                              History [ LZS_HISTORY_SIZE ] ;
    BYTE                              DecompBuf [ STAC_DCOMP_MAX ] ;
    BYTE                              DecompBusy;
    BYTE                              RxSeq;
    UINT32                            RxNeedReset;

};

#define PID_HDLC_SYNC             0x009b
#define  HS_ABORT                 0x80
#define  HS_BEGIN                 0x40
#define  HS_WITH_SEQ              0x20
#define    HS_SEQ                 MLT_PARAM    MLT_SECOND
#define HS_WITH_LENGTH            0x10
#define   HS_LENGTH               MLT_PARAM    MLT_THIRD
#define HS_WITH_DATA              0x08
#define   HS_DATA                 MLT_PARAM    MLT_FORTH
#define  HS_CRC                   0x04
#define  HS_END                   0x02
define  HS_TX_MAX             10000 struct HdlcSyncControl            {
    BYTE                              RxCurrent [HS_TX_MAX]
    UINT16                            RxLength;
    UINT32                            RxSequence;

```
struct ScControl {
    struct MacroLine            *MacroNext;
    BYTE                        *DataNext;
    UINT32                      DataLength;
    struct StacControl          Sc;
    struct HdlcSyncControl      Hs;
};

#define MOP_TEST_BASE   0xc1
#define MOP_BEGIN_BIT   0x04
define MOP_END_BIT     0x02 struct MacroLine NullMacro [] = {
    { 0, MLT_END, 0 }
};

struct MacroLine WholeMacro [] = {
    { 0, MLT_PID, PID_COMPRESS },
    { 0, MLT_PID, PID_HDLC_SYNC },
    { PID_HDLC_SYNC, MLT_PARAM | MLT_FIRST,
                    HS_BEGIN | HS_WITH_DATA | HS_END | 1 },
    { 0, MLT_END, 0 }
};

struct MacLookup {
    UINT32                  Pid;

struct MacroLine        *Macro;
} MacTable [] = {
    { MOP_TEST_BASE | MOP_END_BIT | MOP_BEGIN_BIT, WholeMacro },
    { 0xffffffff, NullMacro }

};

PUBLIC int RxProcessBuff( struct ScControl *Scp, BYTE *Buff, UINT32 Length);

PRIVATE UINT32 RxFetchExt( struct ScControl *Scp, UINT32 For, UINT16 Tag ) {
    UINT32 RetVal = 0;
    struct MacroLine *M = Scp->MacroNext;

if( (M->For == For) && (M->Tag == Tag)) {
        RetVal = M->Value;
        M++;
        Scp->MacroNext = M;
    } else {
        BYTE    *Next   = Scp->DataNext;
            UINT32 Length = Scp->DataLength;
            while( Length) {
                RetVal <<= 8;
                RetVal |= *Next++;
                Length--;
                if( RetVal & 1)
                    break;
            }
            Scp->DataNext = Next;
            Scp->DataLength = Length;
        }
        return(RetVal);
}
```

Figure 13B

```
PRIVATE int RxFindBytes ( struct ScControl *Scp,
                UINT32 ForVal, UINT16 TagVal,
                BYTE **Src, UINT32 *Len)
{
    if ( (M->For == For) && (M->Tag ==Tag)) {
    } else {
        UINT32 Length = *Len;
        if( Length > Scp->DataLength)
            Length = Scp->DataLength;
        *Src = Scp->DataNext;
        *Len = Length;
        Scp->DataNext += Length;
        Scp->DataLength -= Length;
    }
    return (0);
}

PRIVATE int RxHdlcSyncComp ( struct ScControl *Scp )
    UINT32 Options;
    UINT32 ThisSeq = 0;
    UINT32 Length = 0;

Options = RxFetchExt ( Scp, PID_HDLC_SYNC, MLT_PARAM | MLT_FIRST);
    if( !(Options & 1))
        return (1);
    if( Options & HS_WITH_SEQ)
        ThisSeq = RxFetchExt ( Scp, PID_HDLC_SYNC, HS_SEQ);
    if( Options & HS_WITH_LENGTH)
        UINT32 Temp;
        if( !(Options & HS_WITH_DATA))
            return(2);
        Temp = RxFetchExt ( Scp, PID_HDLC_SYNC, HS_LENGTH);
        if(!(Temp & 1))
            return(3);
        PPP_DROP_EXTEND( Temp, Length );
} if( Options & HS_ABORT)  {
        if( Scp->Hs.RxLength >  {
            USER_SEND( Scp->Hs.RxCurrent, Scp->Hs.RxLength, TX_BD_ABORT);
        }
        Scp->Hs.RxLength   = 0;
        Scp->Hs.RxSequence = 0;
    } if( Options & HS_BEGIN)

Scp->Hs.RxLength   = 0;
        Scp->Hs.RxSequence = ThisSeq;
    } if( ThisSeq != Scp->Hs.RxSequence) {
        Scp->Hs.RxLength   = 0;
    } if( Options & HS_WITH_DATA)  {
        BYTE *Source;
        int Stat;

if( Options & HS_WITH_LENGTH) {
            UINT32 Temp = HS_TX_MAX - Scp->Hs.RxLength;
            ASSERT( Length <= Temp );
        } else {
            Length = HS_TX_MAX - Scp->Hs.RxLength;
        }

Stat = RxFindBytes( Scp, PID_HDLC_SYNC, HS_DATA, &Source, &Length);
        if( Stat) {
            Scp-Hs.RxLength   = 0;
            Scp-Hs.RxSequence = 0;
            return (Stat);
        }
```

Figure 13C

```
            {
                BYTE *D = &(Scp->Hs.RcCurrent [Scp->Hs.RxLength]);
                BYTE *S = Source;
                BYTE *E = S + Length;
                Scp->Hs.RxLength += Length;
                ASSERT( Scp->Hs.RxLength <= HS_TX_MAX);
                while( S < E)
                    *D++ = *S++;
            }
        }
        If( Options & HS_END) {
            If( Scp->Hs.RxLength) {
                If(Otions & HS_CRC) {
                    USER_SEND( Scp->Hs.RxCurrent, Scp->Hs.RxLength, TX_BD_TC);
                } else {
                    USER_SEND( Scp->Hs.RxCurrent, Scp->Hs.RxLength, 0);
                }
            }
            Scp->Hs.RxLength   = 0;
            Scp->Hs.RxSequence = 0;
        }
        return (0);
    }
    PRIVATE int RxCompress ( struct ScControl *Scp ) {
        int Stat;
        UINT32 Length;

ASSERT( Scp->Sc.DecompBusy == 0);
        ASSERT( Scp->DataLength);
        {
            BYTE Seq = Scp->DataNext [0];
            Scp->DataNext++;
            Scp->DataLength--;
            If( !Seq ) {
                Scp->Sc.RxSeq = 1;
                Scp->Sc.RxNeedReset = 0;
            } else If( Seq == Scp->Sc.RxSeq) {
                Seq++;
                If( !Seq) Seq = 1;
                Scp->Sc.RxSeq = Seq;
            } else {
                Scp->Sc.RxSeq = 0;
                Scp->Sc.RxNeedReset = 1;
                return (1);
            }
        }
        Scp->Sc.DecompBusy++;
        {
            BYTE *Src    = Scp->DataNext;
            UINT32 SrcLen = Scp->DataLength;
            BYTE *Dst    = &(Scp->Sc.DecompBuf[0]);

UINT32 DstLen = STAC_DCOMP_MAX;
            UINT32 Temp;
            BYTE Hold;
            BYTE *Where;

Temp = LZS_Decompress( &Src, &Dst, &SrcLen, &DstLen,
                                        &(Scp->Sc.History[0]), LZS_RESET);
            ASSERT( Temp == (LZS_SOURCE_EXHAUSTED | LZS_FLUSHED));
            ASSERT( SrcLen == 0);
```

Figure 13D

```
            Temp = Src - Scp->DataNext;
            If( Temp > Scp->DataLength)
                Temp--;
            ASSERT( Temp <= Scp->DataLength);
            Scp->DataNext += Temp;
            Scp->DataLength -= Temp;
            Length = STAC_DCOMP_MAX - DstLen;
        }
        Stat = RxProcessBuff( Scp, Scp->Sc.DecompBuf, Length);

Scp->Sc.DecompBusy--;
        return( Stat );
    }
    PUBLIC Int RxProcessBuff( struct ScControl *Scp, BYTE *Buff, UINT32 Length) {
        Int Stat = 0;
        BYTE *SaveNext;
        UINT32 SaveLength;

SaveNext    = Scp->DataNext;
        SaveLength  = Scp->DataLength;
        Scp->DataNext = Buff;
        Scp->DataLength = Length;

while( 1 ) {
            UINT32 Pid;

Pid = RxFetchExt( Scp, 0, MLT_PID );
            If( IPid & 1) {
                Stat = (Pid != 0);
                goto Exit;
            }

If( IS_MACRO_PID( Pid)) {
                struct MacLookup *p = &(MacTable[0])
                while( p->Pid < Pid) p++;
                If( p->Pid != Pid) {
                    Stat = 1;
                    goto Exit;
                }
                Scp->MacroNext = p->Macro;
                continue;
            } switch ( Pid ) {
                case PID_HDLC_SYNC:
                    Stat = RxHdlcSyncComp( Scp );
                    break;

case PID_COMPRESS:
                    Stat = RxCompress( Scp );
                    break;

default:
                    Stat = 2;
                    goto Exit;
            }
            If( Stat)
                goto Exit;

}
    Exit:
        Scp->DataNext   = SaveNext;
        Scp->DataLength = SaveLength;
        return( Stat );

COMMUNICATIONS TECHNIQUE FOR TRANSMITTING LIMITED SIZE DIGITAL DATA FRAMES USING MACRO HEADERS TO REPRESENT MULTIPLE HEADER CODE PATTERNS ASSOCIATED WITH ENCAPSULATION PROTOCOLS AND SIGNAL PROCESSING OPERATIONS TO WHICH TRANSMITTED DATA ARE SUBJECTED

FIELD OF THE INVENTION

The present invention relates in general to digital communication systems, and is particularly directed to a digital signal encoding/decoding mechanism through which a plurality of header code portions of a limited size digital data frame are replaced by a prescribed abbreviated (e.g. one byte) 'macro' header code, the macro header code byte being representative of a plurality of protocol, signal processing and parameter representative fields that would otherwise require a longer overhead sequence as a precursor to data transmission of the digital data frame.

BACKGROUND OF THE INVENTION

Because of the diversity of digital data processing equipment types and data formats employed by such equipments, in order to exchange digital information over a communications network between different signal processing devices, it is necessary specify a given protocol through which the data being processed or supplied by a given device is assembled into a preestablished format for transmission from a first site over a communication link to a second site, where the data is recovered and output to a destination device.

FIG. 1 diagrammatically illustrates a typical example of a digital communications system (e.g. a digital telecommunications system capable of handling voice, video and data signals) through which digital data communications are conducted between respective network sites, identified as a west transceiver site 11 and an east transceiver site 13, over a digital communications network 15. West transceiver site 11 includes a digital communications transceiver 20, such as that diagrammatically illustrated in FIG. 2, which has local user-associated receive and transmit ports 21 and 22, respectively coupled via an incoming link 24 from the west user's data terminal equipment 27, and an outgoing link 25 coupled to the west user's data terminal equipment. The digital communications transceiver 20 of the west transceiver site 11 also has network-associated transmit and receive ports 31 and 32, respectively coupled via an outgoing or transmit link 34 to the network 15, and an incoming or receive link 35 from the network.

Similarly, east transceiver site 13 includes its own digital communications transceiver 40, again as shown in FIG. 2, having local user-associated receive and transmit ports 41 and 42, respectively coupled via an incoming link 44 from the east user's data terminal equipment 47 and an outgoing link 45 to the east user's data terminal equipment 47. The digital communications transceiver 40 of the east transceiver site 13 also has network-associated transmit and receiver ports 51 and 52, respectively coupled via an outgoing or transmit link 54 to the network 15, and an incoming or receive link 55 from the network.

As diagrammatically shown in FIG. 2, a respective one of the transceivers 20 and 40 employed at the west and east sites of the network of FIG. 1 includes a digital data transceiver unit (such as a Model 68302 bidirectional digital communications device, manufactured by Motorola Inc.), which contains first and second transmit/receive pairs of serial communications controller (SCC) units 60 and 70 and an attendant microprocessor 80 (including associated memory/buffer storage for incoming and outgoing data frames). User-associated SCC 60 includes a pair of transmit and receive serial communications controllers (SCCs) 61 and 62 coupled to respective transmit and receive ports 63 and 64 on the user side of the transceiver. Similarly, network-associated SCC 70 includes a pair of serial communications controllers 71 and 72 coupled to transmit and receive ports 73 and 74 on the network side of the transceiver.

Digital data sourced from a user's data terminal equipment to be transmitted over the network 15 at a prescribed baud rate (e.g. 56 KBaud) is packetized by the transceiver into limited frame size (e.g. 256 bytes/frame), each data frame being formatted in accordance with a prescribed digital data encapsulation protocol (e.g. High level Data Link Control or HDLC) and an optional compression mechanism (e.g. conventional STAC compression).

Because the data to be transmitted, such as a multipage text file supplied from a user's DTE, is generally comprised of a variable length serial string of digital bytes, which is applied to the local receive port 64, it is initially written into a relatively large capacity (e.g. 10 KBytes) user buffer, the capacity of which is preferably sized to accommodate the largest anticipated user data frame. The transmission control routine employed by the transceiver's microcontroller 80 is operative to cause successive portions of the buffered incoming data stream to be assembled into limited size data frames (256 bytes/frame) for network transmission in accordance with the requirements of the given network, so that serial packetized data is transmitted from transmit port 73 out over the network link 15. Although, for purposes of the present description, Ethernet protocol is referenced as a typical scheme for digital communications requiring transport over the network, it should be observed that the invention to be described below is not limited to use with this or any other protocol.

As diagrammatically illustrated in FIG. 3, a typical HDLC frame 101 of Ethernet user data may include an overall data portion 100, which is made up of an address field 103, containing respective source and destination address subfields 105 and 107, an Ethernet type field 111, a variable length (multi-byte) data field 113, and a frame check sequence (FCS) field 115 (comprised, for example, of a pair of frame check sequence bytes 115-1 and 115-2). Leading (beginning) and trailing (terminating) frame boundaries are respectively demarcated by a start-of-frame flag (F) byte 102 and an end-of-frame flag (F) byte 116.

FIG. 4 shows a simplified version of the HDLC data frame of FIG. 3, in which the data portion 100 of a frame is diagrammatically illustrated as comprising a sequence 140 of respective data bytes A, B, C, ..., and terminating in two frame check sequence bytes F1 and F2.

In order for transceiver equipment at a remote end of the network to properly assemble successive frames of data and direct the data to a destination device, it is necessary to include, as part of a network frame, control information employed by the transceiver for this purpose. As diagrammatically illustrated in FIG. 5, when point-to-point protocol (PPP) is employed to encapsulate the data 140 into successive data frames, a series of header bytes (including one or more protocol identifier (PID) and parameter bytes), shown at 121, is appended to the data portion 110 to generate a message segment 124. The header 121 is located within the message segment, such that the bytes containing the protocol identifier (PID) 126 are also the first bytes in the segment 124, so that the form of any segment can be determined at the receiver site simply by examining the first bytes.

Since the encoding mechanism is recursive, a segment group may be processed and the result treated as through it is simply data. Compressed as shown in FIG. 6, compressed data 127 is a processed version of segment 124 of FIG. 5, so that the addition of the header 130, containing a PID portion 128 that specifies the type of signal processing that has been performed, results in a 'nested' header.

For network usage efficiency, the Ethernet segment 124 of FIG. 5 is preferably compressed into a homogeneous compressed sequence, shown at 131 in FIG. 6. Specifically, after appending the PPP Ethernet header 121 to the data portion 110 to create Ethernet segment 124 of FIG. 5, the Ethernet segment 124, in turn, is processed by means of a compression algorithm into a plurality of 'compressed' data bytes, shown at 127 in FIG. 6, and a PPP compression header 130 (containing compression PID 128) and an associated data frame sequence number byte 129 are appended to the compressed data bytes 127 to produce a nested compressed segment 131, which is transmitted over the network.

The encoding and compression technique represented by the data frame formats of FIGS. 3–6 enjoys a number of apparent advantages. The first is its simplicity, in that, although there may be many different possible PIDs, it is only necessary to consider them one at a time. A second advantage is the fact that the technique is reasonably flexible, since the receiver at the remote site does not need to know how to decode a received message prior to actual receipt of the message, as each segment contains a PID detailing the decoding procedure. Thirdly, since the PIDs are mutually independent, the addition of new PIDs allows the procedure to be expanded without changing existing PIDs.

On the other hand, a fundamental problem with the above described technique is its poor network bit efficiency. More particularly, although data compression is useful for reducing the number of network bits that must be transmitted, if the Ethernet frame 101 is relatively small, then the apparent gain from compression is lost by the overhead imparted by the segment headers 130 and 121 specifying the decoding procedure. Namely, the problem of efficiency is a direct result of the advantages of the scheme.

One proposal to circumvent this inefficiency problem is simply to ignore it. This actually works well on data having large message segments, since the overhead associated with the headers is fixed, so that the overhead is only a small percentage of the total number of bits transmitted over the network. A second approach is to reduce the length of the header by using a carefully chosen encoding mechanism. One example of this technique would be to pack all parameter flag bits into a single byte.

Another solution involves shortening the header by taking something out. Unfortunately, this generally reduces one of the above advantages. For example, decreasing the number of PID bits also decreases expandability, due to the fact that the number of available PIDs is also reduced. Another alternative strategy is to compress some of the header bytes together with the data being formatted. In fact, the above-described compressed Ethernet example performs this operation, with the nested header 121 containing the source Ethernet packet being located within the compressed part of segment 131. However, this scheme has two shortcomings.

First, the header 121 itself is often effectively incompressible, since it is already carefully encoded. Compressing an effectively non-compressible code generally results in a net loss of bit efficiency. Secondly, since the header 121 is generally a statistically different type of data field than the data 110 itself, using two types of data may make the compression operation produce more bits for the processed data. A further solution is to combine PIDs—for example, by creating a further opcode to indicate both Ethernet packetizing and compression. While such a scheme will work, it reduces flexibility and expandability.

SUMMARY OF THE INVENTION

In accordance with the present invention, the desirability of improving network bit efficiency, but without the attendant shortcomings, such as reducing expandability and flexibility in the above-described approaches, is successfully addressed by means of a new and improved digital signal encoding/decoding mechanism, through which a selected header portions of a digital signal sequence are replaced by a prescribed abbreviated (e.g. one byte) 'macro'-header PID byte. The macro-header PID byte itself is representative of a plurality of protocol and signal processing operation representative fields that would otherwise require a longer overhead sequence as a precursor to data transmission.

When a macro-header PID byte is encountered at the receiver, the receiver translates the macro-header PID byte into a predefined sequence of PIDs, parameters and data bytes. Whenever the receiver requires another PID, parameter or data byte, it initially attempts to satisfy its need from the previously encountered macro-header PID byte. Otherwise, the necessary information is obtained from the data frame segment being interpreted.

In accordance with the present invention, the length of the header portion of a respective data frame is considerably reduced through a combination of negotiating and encoding relationships for defining the translation of the macro-header PID byte. The substitution of such a macro-header PID byte in place of normally transmitted header and header parameter information makes it possible to effectively minimize the number of bits that would otherwise have to be transmitted in each network data frame.

For a typical user-sourced HDLC data frame containing a sequence of data bytes followed by frame check sequence bytes, and employing point-to-point protocol (PPP) to encapsulate the data, a protocol identifier (PID) is normally appended to the front end of the data frame. In accordance with the present invention immediately following this PID field is a header parameter byte, the bit contents of which provide precursor information to the receiver which facilitates the receiver's processing of the received data frame.

Normally, assuming the use of data compression for network usage efficiency, an HDLC data frame incorporating such a header would be encapsulated for transmission prior to compression, and the entire HDLC data frame compressed into a homogeneous compressed sequence. For this purpose, an additional compression PID and a sequence number byte would be appended to the front end of the compressed HDLC frame and the resulting frame transmitted over the network.

In accordance with the present invention, in place of appending and compressing a set of precursor headers, a macro-header is appended to a field, the contents of which are a compressed version of data supplied by the user. The macro-header PID is representative of a plurality of signal processing operations (e.g. the type of digital communication protocol, such as Ethernet encapsulation, and compression of the data). At the receiver, this macro-header PID is employed as a default entry or pointer to a macro-code table that is stored in the receiver's micro-controller and contains a listing of signal processing representative codes that are iteratively read by the receiver's processor and then invoked to recover the respective frames of data.

Thus, a frame of data formatted at the transmitter using the macro-code mechanism of the present invention begins with a macro-header that contains a protocol identification byte (PID) and constitutes a default entry or pointer to the first listing of an associated macro-code table stored in memory used by the receiver's microcontroller. When this network data frame-leading macro-opcode is detected in the receiver's data buffer, the receiver defaults to the macro table the listings in which translate the macro-header into an associated sequence of PIDs, parameters and data bytes. During the course of data frame recovery, as the receiver's microcontroller steps through the contents of the received data buffer, it initially defaults to the macro-code listing for the next information byte. Within the macro-table itself, each entry is tagged with a functional identifier, so that the receiver's microcontroller will know whether or not the next piece of information is resident in the listings in the macro-table or is part of the received data frame.

Advantageously, because of the frequency of repetition of various header bytes and associated parameter data, the macro-code mechanism in accordance with the present invention makes it possible to accommodate a substantial number of the header bytes that would normally have been appended to a user data field, so that the remainder of the data frame is simply the data, contained within a compressed data field.

BRIEF DESCRIPTION OF THE DRAWINGS

FIG. 10 shows a macro-code table;

FIGS. 13A–13E contain a source doe listing for executing the macro-decoding mechanism of the invention.

DETAILED DESCRIPTION

Figure 1:
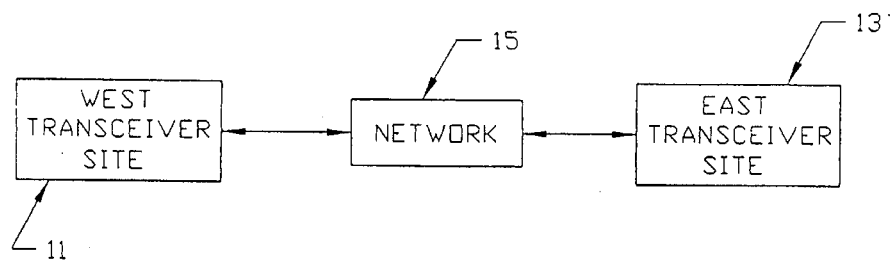
FIG. 1 diagrammatically illustrates a typical example of a digital telecommunications system capable of handling voice, video and data signals, through which digital data communications are conducted between respective network sites.
Figure 2:
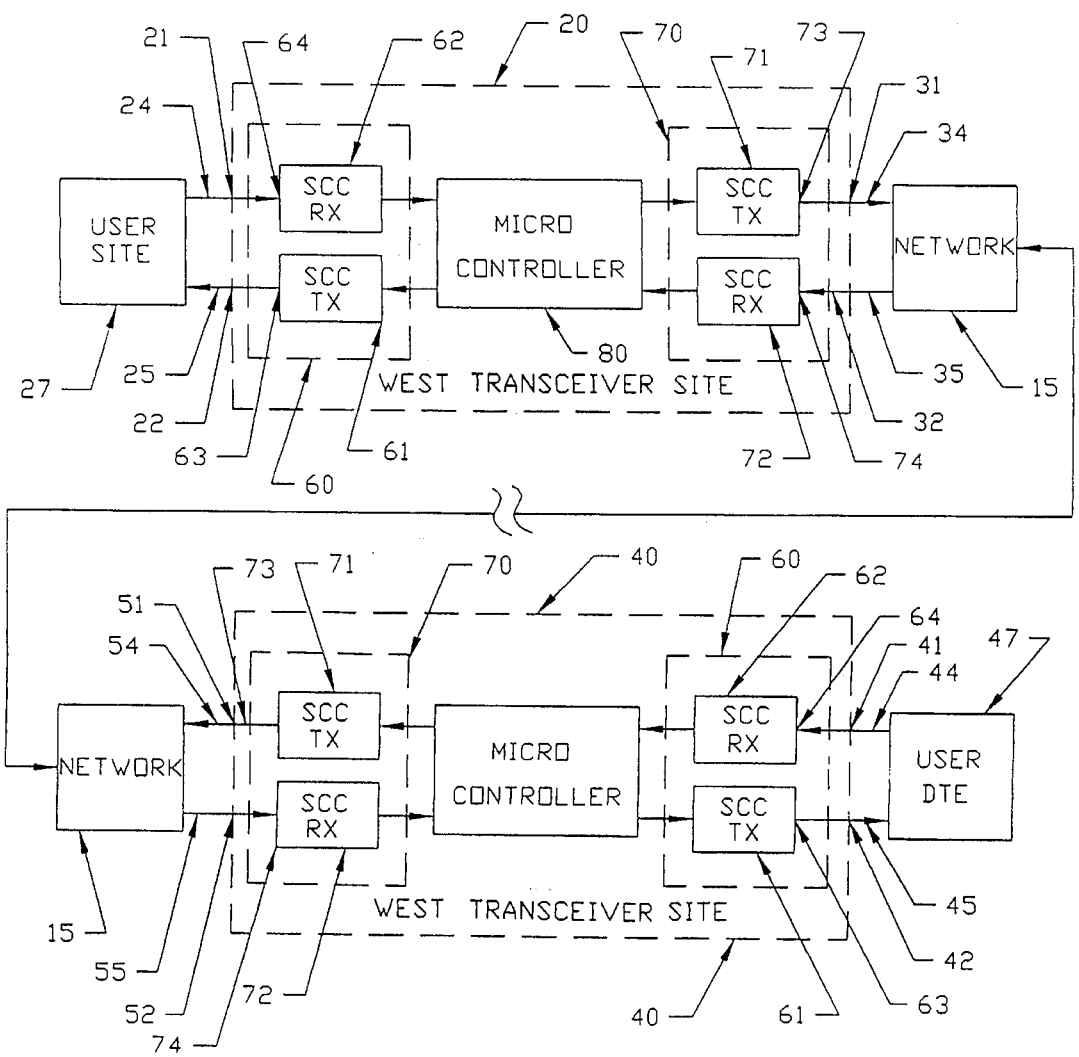
FIG. 2 diagrammatically shows a respective transceiver employed at the west and east sites of the network of FIG. 1.
Figure 3:
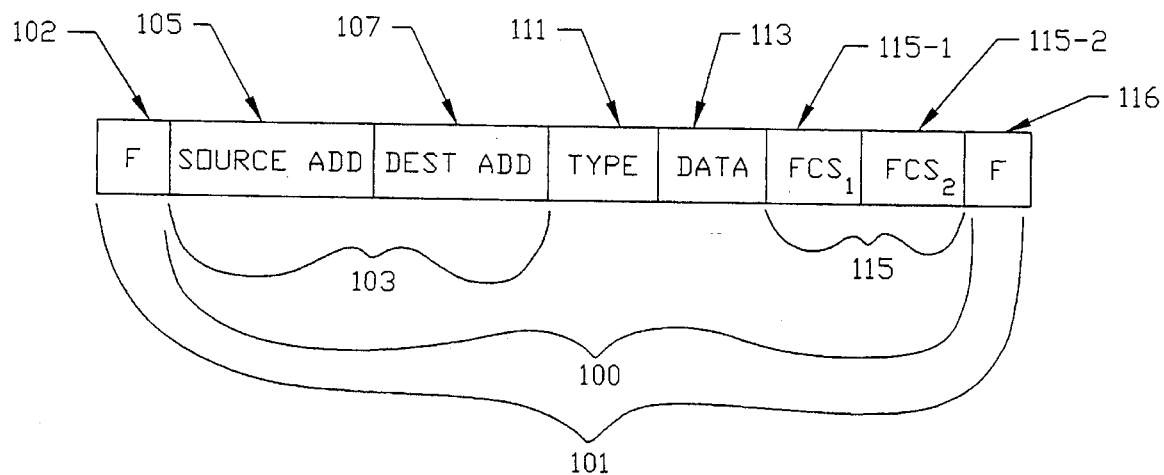
FIG. 3 diagrammatically illustrates an Ethernet HDLC data frame.

Before describing in detail the new and improved macro-header based communications technique in accordance with the present invention, it should be observed that the present invention resides primarily in an augmentation of the communications control software currently employed by a time division multiplexed digital communications controller, which controls the conversion of variable length incoming serialized user digital data sourced from a user's data terminal equipment into limited size data frames, each of which data frames is formatted in accordance with a prescribed network communication protocol for transmission over a serial digital data communications network link and, conversely, the recovery from the network link of successively received ones of such limited size data frames from another network site into the original format of the user data for delivery to the local user's equipment. The details of the circuitry of the transceiver are otherwise essentially unaffected.

Accordingly, the structure, control and arrangement of the transceiver components and its supervisory microcontroller have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood. (As an adjunct to the present description, FIGS. 13A–13E contain a source code listing for executing the macro-decoding mechanism of the invention.)

As pointed out briefly above, in accordance with the present invention, the overall length of header information that is included as part of a respective data frame is considerably reduced through a combination of negotiating and encoding relationships for defining the translation of a 'macro'-header PID (or macro code). The substitution of such a macro-header PID in place of normally transmitted header and header parameter information makes it possible to effectively minimize the number of bits that would otherwise be transmitted in each network data frame.

To implement this substitution, the macro-encoding mechanism of the present invention sets aside a portion of the available PID values as reduced length, general purpose macro-invocation PIDs, which may be used to replace commonly used sequences of PIDs, parameters and data bytes. In order to facilitate an understanding of the present invention, the manner in which the invention operates on reduced length version of the data frame format of the above-referenced example of FIGS. 3–6 will be initially described.

Figure 5:
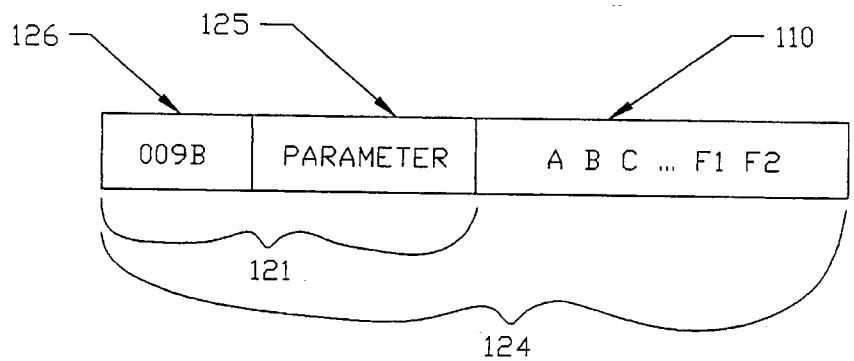
FIG. 5 diagrammatically illustrates a frame of data encapsulated by point-to-point protocol into successive data frames, with a series of header bytes appended to the data portion to generate a message segment.

In the present example of employing point-to-point protocol (PPP) to encapsulate the data, a header is appended to the front end of the data frame. For HDLC protocol, a two byte hexadecimal code (00-9B), which corresponds to the protocol identifier 126 of FIG. 5, is employed as a first or leading PID byte, indicating that HDLC protocol is employed. Immediately following this PID field is an opcode header parameter byte, the bit contents of which are shown at B1–B8 in FIG. 7. The respective bits of this opcode header parameter byte are chosen to provide precursor information to the receiver which facilitates the receiver's processing of the received data frame.

More particularly, the first or most significant bit B1 of the opcode header parameter byte is an abort bit. If asserted (the bit value equals '1'), the abort bit instructs the receiver's microcontroller that no more data is to follow in this frame and that the current data frame is being aborted. The receiver interprets the asserted abort bit by simply forwarding the contents of the frame buffer out to the user's DTE as an aborted frame.

The second bit B2 of the opcode header parameter byte is a begin bit. When asserted, the begin bit represents that the incoming data frame is the first or beginning frame of a new message. The receiver's microcontroller responds by discarding or resetting whatever data is currently in the receive buffer. (This bit would be asserted in the present example.)

The third bit B3 is a DTE sequence number bit. By asserting this bit, the transmitter tells the receiver that immediately following the current opcode header byte is a sequence number byte, the contents of which represent the position of the current frame in a sequence of data frames being sent to the receiver. The receiver's microcontroller compares this sequence number with the expected number of the current data frame, in order to determine whether or not the current frame is in the correct order. If the two numbers fail to match, the current frame is discarded. If the two numbers match, the frame is considered to be 'in sync' and is accepted for further processing.

The fourth bit B4 is a length bit. When asserted the length bit indicates that the frame contains a data byte representative of the length of the frame. The use of this bit allows multiple 'shortened' frames, whose lengths are less than that of a full frame (full frame=256 bytes), to be combined or 'stuffed' into a single frame, and thereby provide for more efficient use of the network, than would be the case if multiple reduced capacity frames were assembled and transmitted.

The fifth bit B5 is a data present bit. When asserted, this bit simply says that the frame contains data, (also asserted in the present example).

The sixth bit B6 is a CRC (cyclic redundancy check)-included bit. When asserted, this bit indicates that the data field contains the above referenced pair of frame check sequence bytes F1 and F2. When not asserted, this bit indicates that the data field does not contain the frame check sequence bytes and that instead the receiver needs to calculate these bytes.

The seventh bit B7 is an end bit. When asserted, the end bit represents that the incoming data frame is the last or end frame of the message. Thus, when neither of the begin and end bits is asserted (which will be the case of most data frames), the receiver is informed that the current frame is located between the first and last frames of the message. (For purposes of the present example, the seventh bit may be considered to be asserted.)

The eighth or least significant bit B8 is an extension bit. Normally, for single byte opcode header parameter bytes, the extension bit is asserted. If not asserted, the extension bit indicates that immediately following the current opcode header parameter byte is an additional or extension opcode header parameter byte. (For purposes of the present example, the eighth bit is also asserted.)

Figure 7:
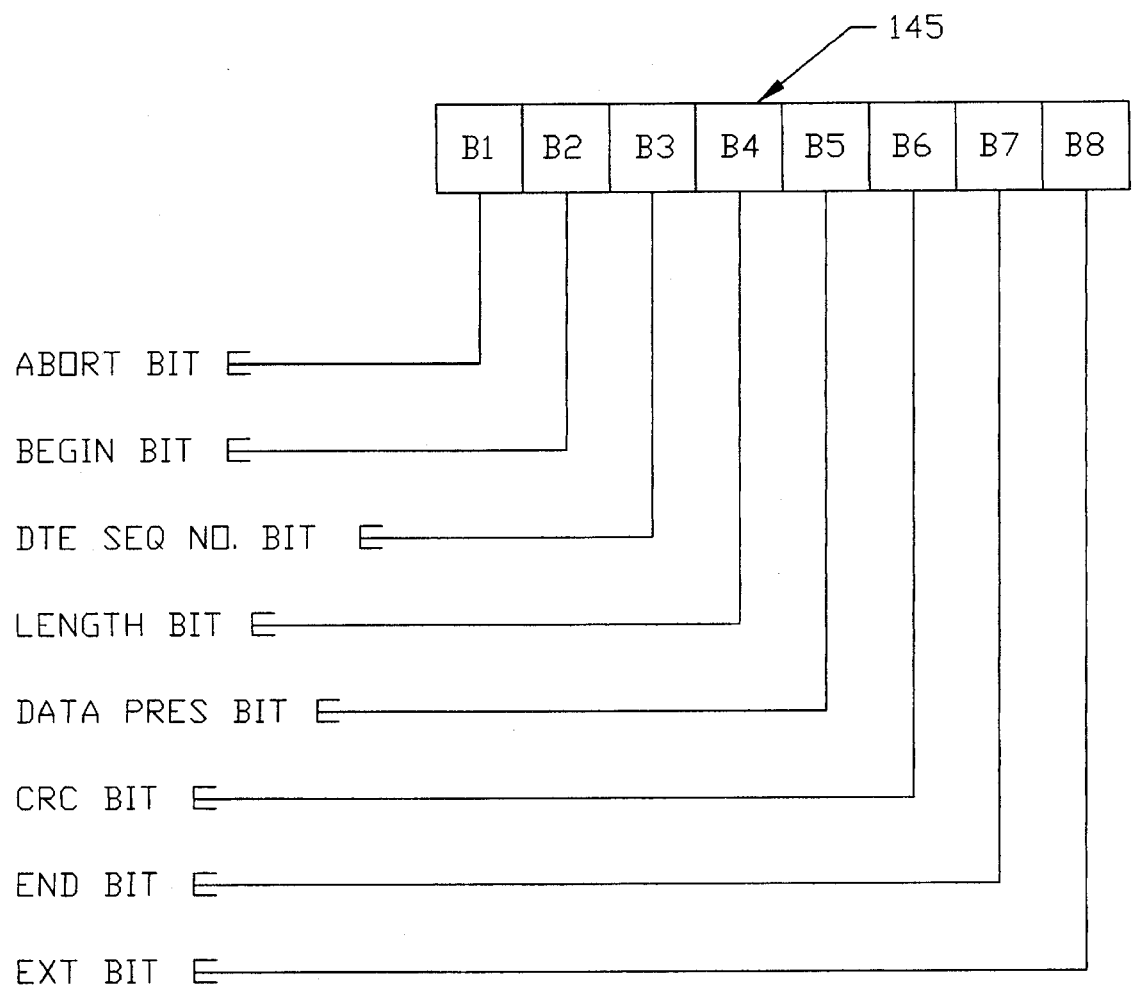
FIG. 7 diagrammatically illustrates the bit contents of an opcode header parameter byte.

FIG. 5, referenced previously, shows the manner in which an HDLC data frame 110 incorporating an opcode header parameter byte 125 of FIG. 7 would normally be encapsulated for transmission prior to compression. For the reduced complexity example of FIG. 4, which diagrammatically represents the data portion 140 as a sequence of data bytes A, B, C, . . . , followed by two frame check sequence bytes F1 and F2, a protocol identifier (PID) 126 is appended to the front end of the data frame 110. As noted earlier, for HDLC protocol, a two byte protocol identifier hexadecimal code (00-9B) constitutes the first field 126 in the data frame, and is immediately followed by a header parameter byte 125, the contents of which correspond to the byte 145 of FIG. 7. Immediately following the opcode header byte 125 is the data field 110 comprised of one or more (usually a plurality) data bytes 140.

Assuming the use of data compression for network usage efficiency, the entire HDLC data frame of FIG. 5 would normally be compressed into a homogeneous compressed sequence. For this purpose, as shown in FIG. 6, referenced previously, an additional compression precursor byte (00FD) 128 and a sequence number byte 129 would be appended to the front end of the compressed HDLC frame 127, and the resulting frame 131 would then transmitted over the network.

Figure 6:
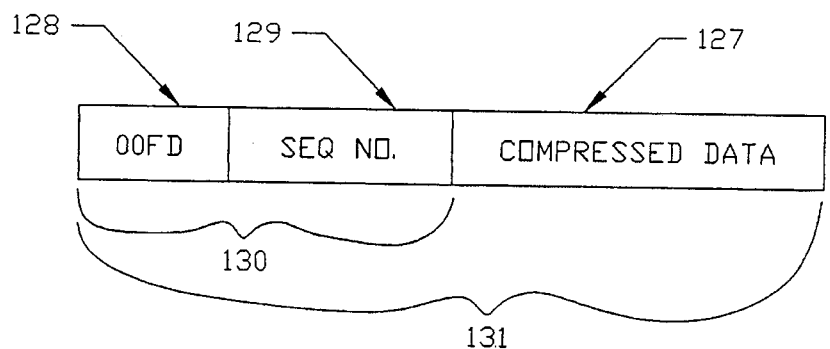
FIG. 6 shows the encapsulated Ethernet HDLC frame of FIG. 5 compressed into a homogeneous compressed sequence.
Figure 4:
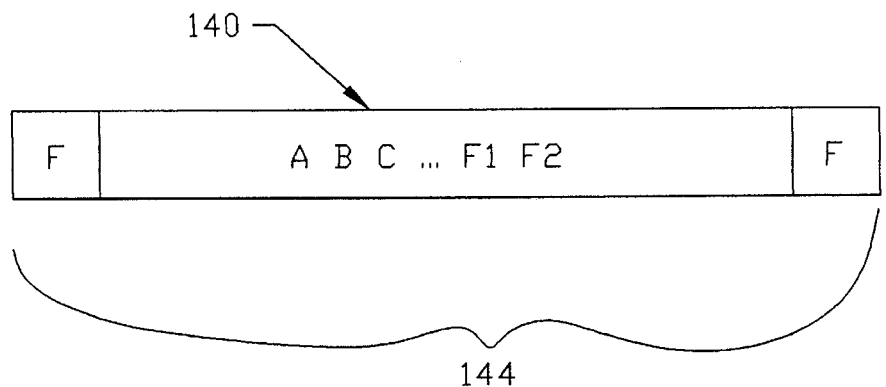
FIG. 4 is a simplified version of the data frame of FIG. 3.
Figure 8:
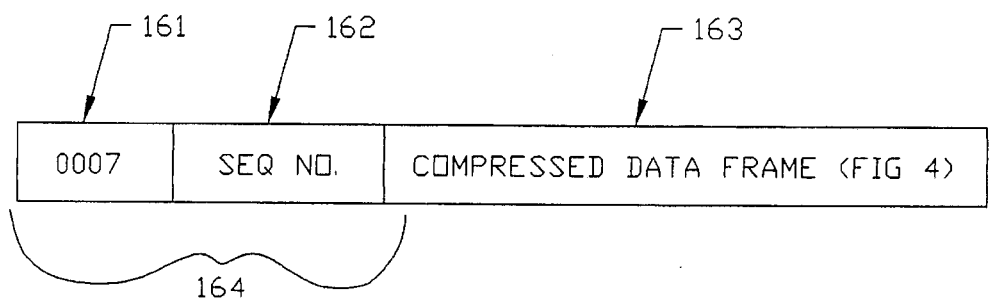
FIG. 8 shows the manner in which the HDLC data frame of FIG. 4 would normally be compressed into a homogeneous compressed sequence, using a macro-code mechanism.

In accordance with the present invention, however, rather employ the front end header mechanisms of FIGS. 5 and 6, instead, as shown in FIG. 8 a macro-header 164 is appended to a field 163 the contents of which are a compression of the data 140 supplied by the user. The macro-header PID byte 161 is representative of both the type of digital communication protocol (encapsulated Ethernet), and processing (compression) of the digital information signals (data) that have been formatted in accordance with network protocol. At the receiver, this macro-header PID byte 161 is employed as a default entry or pointer to a macro-code table 184 (FIG. 10) that is stored in the receiver's micro-controller and contains a listing of signal processing representative codes that are iteratively read by the receiver's processor and then invoked to recover the respective frames of data.

As noted above, each transmitted macro-code represents a plurality of signal processing operations that have been determined to be repeatedly employed on a sufficiently frequent basis as to warrant the assembly and transmission of an associated functional abbreviation for the plurality of operations as part of the transmitted data frame.

Figure 9:
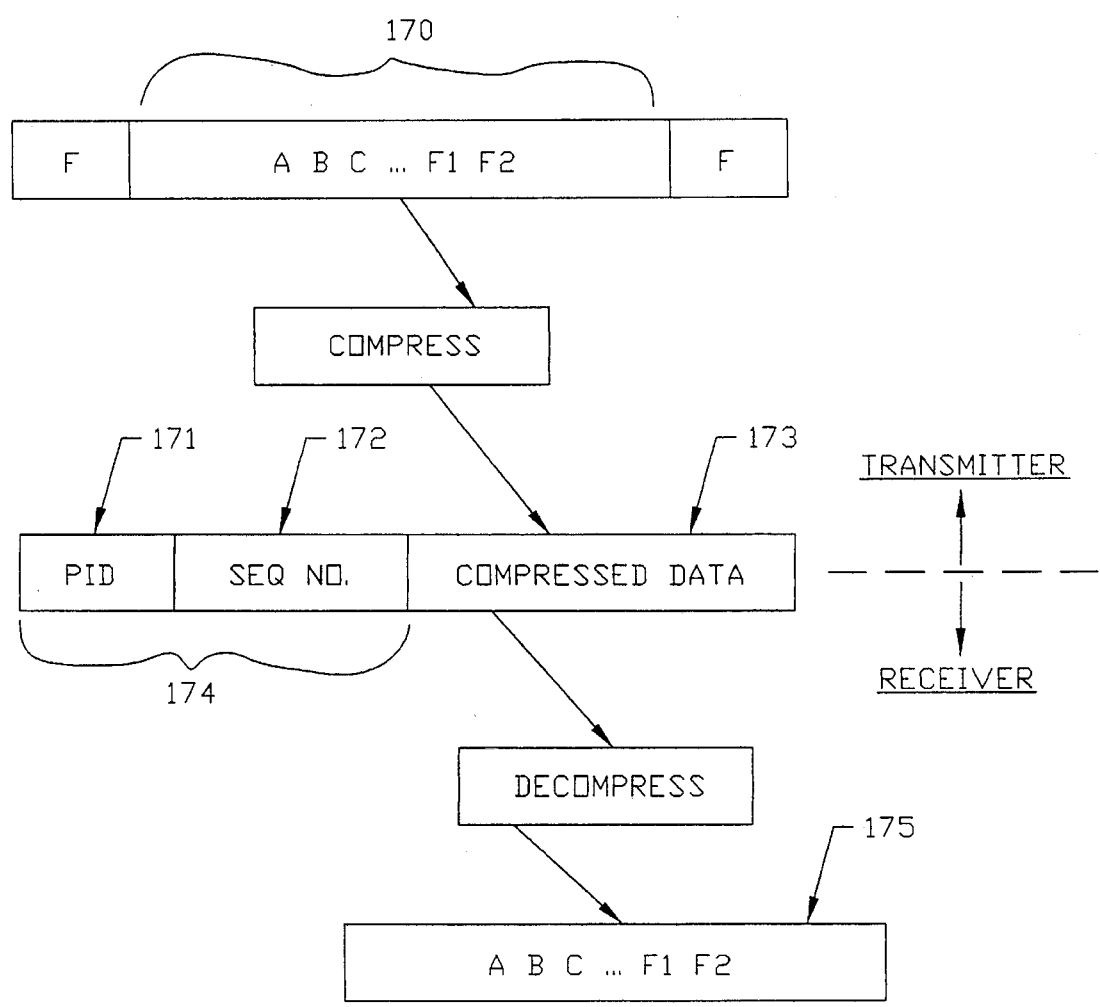
FIG. 9 diagrammatically illustrates a frame of data that is formatted at the transmitter and then reassembled at the receiver using the macro-code mechanism of the present invention.

FIG. 9 diagrammatically illustrates a frame of data 170 that is formatted at the transmitter using the macro-code mechanism of the present invention. The data frame begins with a byte that is a protocol identification byte (PID) 171, and constitutes a default entry or pointer to the first listing 181 of an associated macro-code table 184, shown in FIG. 10, stored in memory used by the receiver's microcontroller. When a macro PID is encountered at the receiver, the receiver defaults to the macro table the listings in which translate the macro PID into an associated sequence of PIDs, parameters and data bytes. During the course of data frame recovery, whenever the receiver requires another PID, parameter or data byte, it initially attempts to satisfy its need from the encountered macro PID. Otherwise, the necessary byte is obtained from the segment of the received data frame being interpreted.

More particularly, in accordance with the macro-code mechanism of the present invention, in the course of reading the contents of the incoming data frame, when the receiver encounters a macro (as the first byte 171 in the data frame) it will thereafter default to the macro-code listing for the next information byte. Within the macro-table itself, each entry is tagged with a functional identifier, so that the receiver's microcontroller will know whether or not the next piece of information is resident in the listings in the macro-table or is part of the received data frame.

In the present example, the first byte of the data frame assembled at the transmitter is a macro PID byte, associated with protocol identification byte (PID) listing 181 tagged as a PID macro entry in the macro-table of FIG. 10, so that the receiver knows it is to interpret the first byte of data in accordance with the first entry of the table. In the present example, this first listing—the byte (FD), indicates both that the data of the current frame has been compressed and the type of compression employed to compress the data, for example, STAC compression, referenced above.

The next byte 172 of the data frame is a sequence number byte, described earlier. Since each sequence number is associated with one data frame in a sequence, it is generated on the fly at the transmitter for each respective data frame. For purposes of an illustrative example, the use of only a single byte to represent a sequence number provides for numbers from 0–255. In accordance with a preferred embodiment of the invention, 0 is used to reset the sequence number counter, so that the frame numbers are assigned from 1–255 and then repeating from 1–255, etc. Since the sequence number is generated on the fly and is not part of the macro-table listing, it is not tagged, so that upon defaulting to the macro-table listing 182 of FIG. 10, the receiver's microcontroller will not find a sequence number tag. When no tag is found, the next byte of data (here, the sequence number byte 172) of the received frame is read.

Following the sequence number byte 172 is a compressed data field 173, the compression and type being specified in the macro-listing 181, as described above. Unlike the mechanism of FIGS. 5 and 6, the compressed data field contains only compressed data, not header information appended to the data. Instead, since macro-encoding is employed, the header information is contained in the listings of the macro-table of FIG. 10.

In the present example, the second listing 182 of the macro table is another protocol identifier, here the opcode header (9B) associated with HDLC encapsulation. As explained previously with reference to FIG. 5, the HDLC protocol byte shown at 126 would normally be appended to the data field, and be followed by an associated parameter byte, shown at 125.

Immediately following the HDLC protocol identifier listing 182 of the macro table of FIG. 10 is the last listing associated with this particular macro—a header parameter byte listing 183, corresponding to the header 145 of FIG. 7, which, as noted above, provides precursor information to the receiver to facilitate the receiver's processing of the received data frame.

Thus, other than the sequence number, the macro-table of FIG. 10 accommodates all of the header bytes that would normally have been appended to the data field 110 of FIG. 5, the remainder of the data frame is simply the data, contained within compressed data field 173, described above. When decompressed, data field 173 replicates the original data field 110, as shown at 175 in FIG. 9, which is forwarded to the user's DTE.

Figure 11:
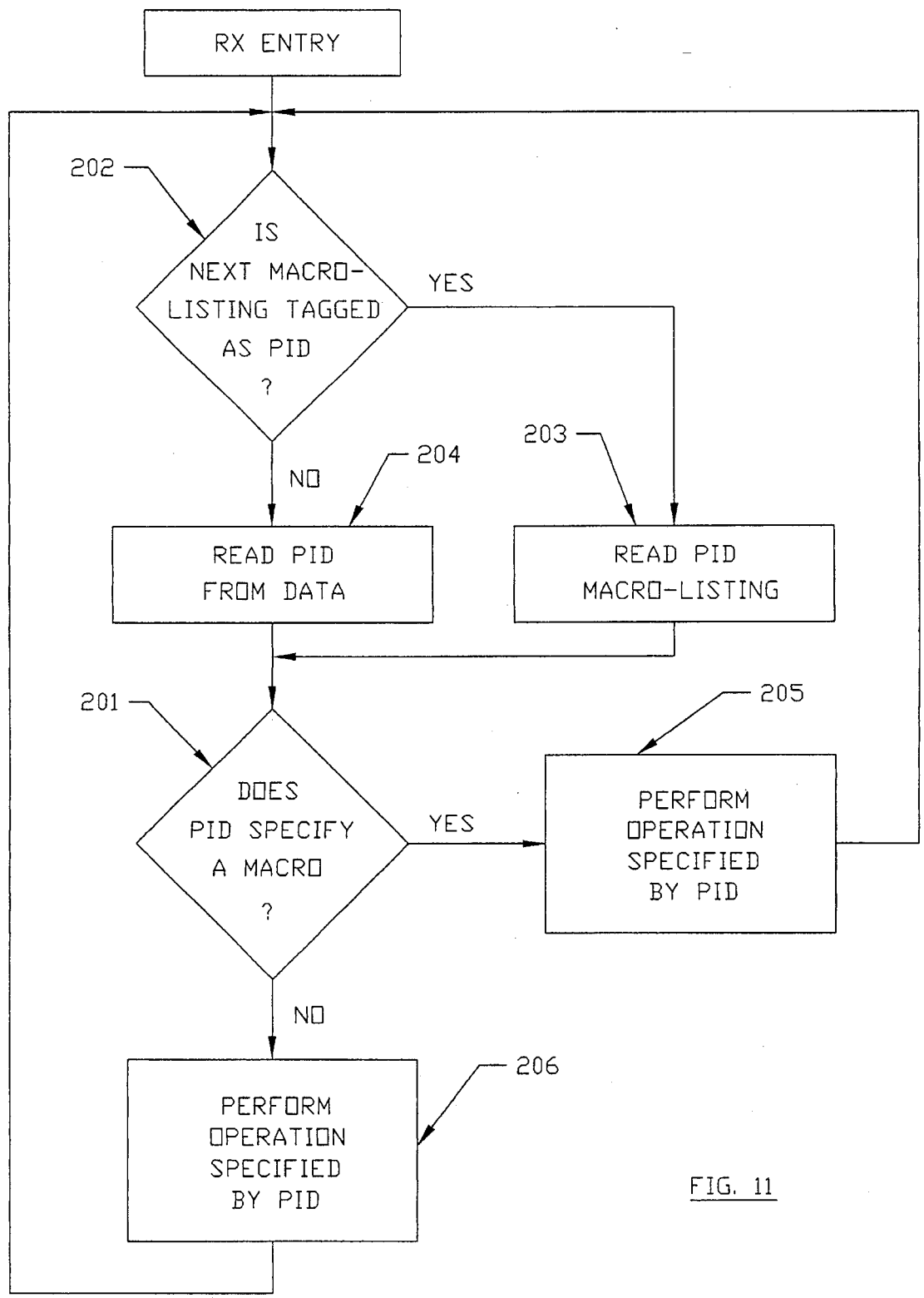
FIGS. 11 and 12 are flow charts which diagrammatically illustrate respective steps of the signal processing routine in which the receiver processes a received data frame formatted in accordance with the macro-header mechanism of the present invention.
Figure 12:
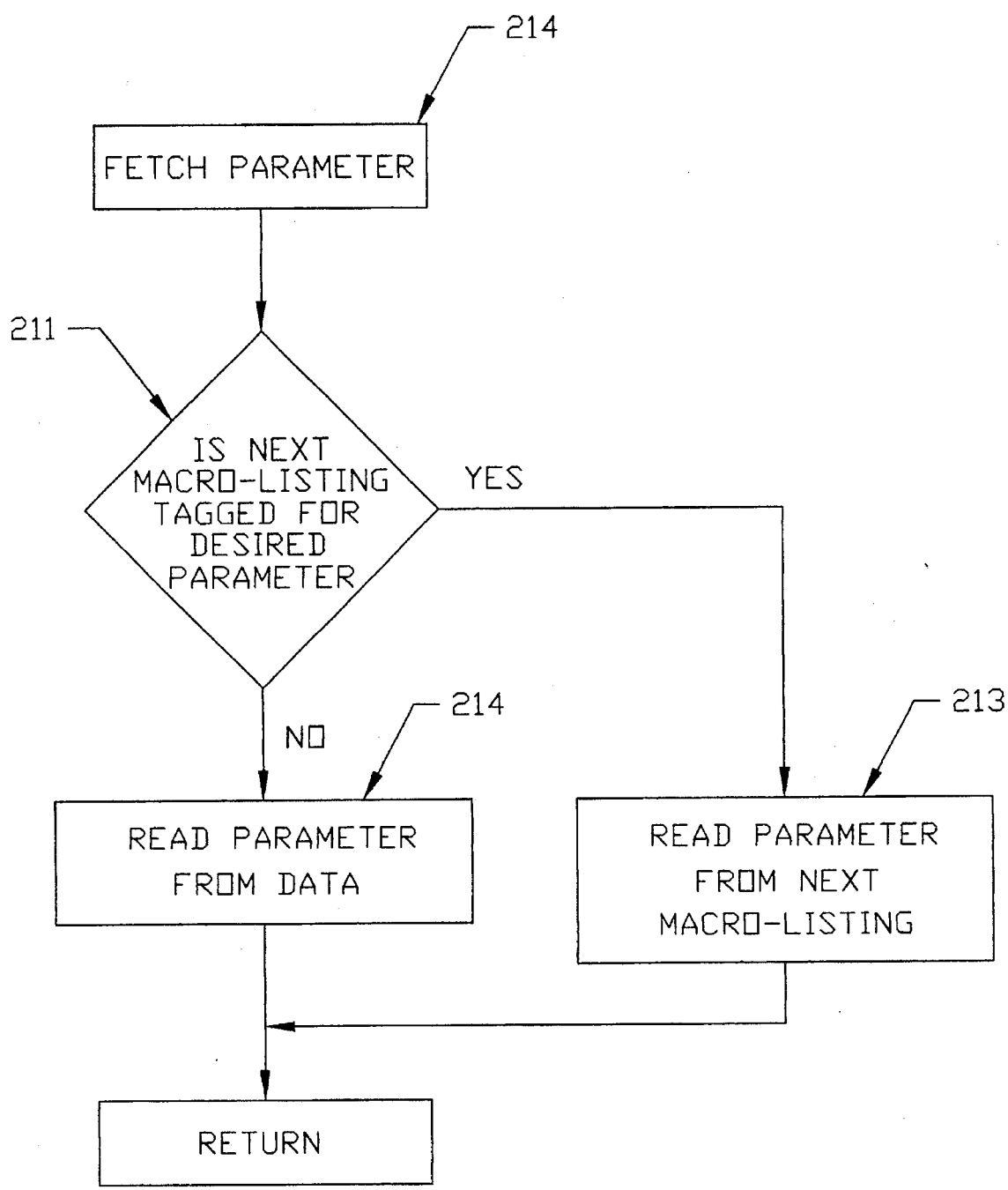

The manner in which the receiver processes a received data frame formatted in accordance with the macro-opcode mechanism described above will now be detailed with reference to the flow chart of FIGS. 11 and 12, which diagrammatically illustrates respective steps of the signal processing routine invoked by the receiver.

For the present example of a received frame of data that has been formatted at the transmitter using the macro-code mechanism of the present invention and illustrated diagrammatically in FIG. 9, as the incoming data frame is clocked into a receive buffer, the first byte 171 is analyzed at query step 201 to determine whether the first byte is a macro PID byte. If the first byte is a macro-code byte (the answer to step 201 is YES), the receiver branches to a macro start-up routine 205, in which it locates a specific one of macro table listings to be the next macro listing. If the answer to step 201 is NO, indicating that macro-processing has not been employed, the receiver simply performs the operation indicated by the first bytes interpreted as a PID for signal processing of the frame, as described above with reference to FIGS. 5, 6 and 8.

Since, in the present example, the answer to query step 201 is YES, indicating that the first byte is a macro PID byte, the macro-routine 184 of FIG. 10 is invoked at step 205 and the first listing 181 in the macro table (FIG. 10) is examined in step 202, to determine whether the entry is tagged as a PID. Here, since the entry 181 is tagged as a protocol identification byte (PID), it is used to specify an operation in step 206.

In the data frame example of FIG. 9, the first listing 181 (FD) of the macro table indicates both that the data portion of the current data frame has been compressed and the type of compression that has been employed at the transmitter to compress the data (e.g. STAC compression).

While performing the decompression operation specified by listing 181 in step 206, a sequence number parameter is required. The 'fetch parameter' procedure of FIG. 12 starting at step 210 is invoked. In step 211, macro listing 182 is queried to determine if it is the desired parameter. Since the next byte 172 of the data frame is a sequence number byte, it is not a tagged entry in the macro-table listing, so that the answer to step 211 is NO. Since no sequence number tag is listed in the macro table, the routine transitions to step 214, to read the current byte of data in the received data frame as the sequence number. As pointed out above, as long as the sequence number matches the frame count number (maintained in the receiver), the current frame is accepted as valid. Otherwise it is considered out-of-sync and is discarded.

Upon the completion of step 214, the routine decompresses the compressed data field 173 and loops to step 202, in which it again looks to the macro table to determine whether the next PID comes from the macro entry 182. In the present example, since the compressed data field contains only the data 140, the macro table entry 182 contains the PID 9B, so that the answer to query step 202 is YES, indicating that the entry is tagged as a PID.

Since the answer to step 202 is YES, the routine gets the PID from the next entry 182 in step 203. Since the tagged HDLC header opcode entry has an associated parameter byte entry, corresponding to the parameter byte 125 detailed in FIG. 7, the receiver's microcontroller derives the parameter information from the table entry 183, using steps 210, 211 and 213, rather than the data frame. The receiver then outputs the reassembled frame 175 to the user. With the parameter byte entry being the last entry in the macro table, the answer to step 202 becomes NO and the routine transitions to step 204, where it reads the end of data and quits.

As will be appreciated from the foregoing description, the desirability of improving network bit efficiency, but without the attendant shortcomings, such as reducing expandability and flexibility in the above-described approaches, is successfully addressed by means of the macro-code mechanism of the present invention, which is operative to replace selected header portions of a digital signal sequence by a prescribed abbreviated (e.g. one byte) macro-code byte, which is representative of a plurality of protocol and signal processing operation representative fields that would otherwise require a longer overhead sequence as a precursor to data transmission. When a macro-code is encountered at the receiver, the receiver translates the macro-code into a predefined sequence of PIDs, parameters and data bytes. Whenever the receiver requires another PID, parameter or data byte, it initially attempts to satisfy its need from the encountered macro-code. Otherwise, the necessary byte is obtained from the data frame segment being interpreted. Since the length of the header portion of a respective data frame is considerably reduced through a combination of negotiating and encoding relationships for defining the contents of the macro-code, the substitution of the macro-header in place of normally transmitted header and header parameter information makes it possible to effectively minimize the number of bits that would otherwise have to be transmitted in each network data frame.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of transmitting a limited sized digital data signal frame over a digital communications network from a first site, to which first user data terminal equipment is coupled, to a second site, to which second user data terminal equipment is coupled, and recovering digital data signals at said second site for application to said second user data terminal equipment, said method comprising the steps of:

at said first site, (a) storing a sequence of data signals supplied by said first user data terminal equipment;

(b) compressing said sequence of data signals stored in step (a) into a sequence of compressed data signals;

(c) defining a frame of digital data signals comprised of a plurality of header signals and said sequence of compressed data signals, a first of said header signals defining a network communication protocol, a second of said header signals defining a compression mechanism by way of which said data signals are compressed for transmission over said network, and a third header signal defining parameters of said data frame;

(d) generating a macro-header signal representative of said plurality of header signals;

(e) assembling a frame of data signals to be transmitted over said network, said frame of data signals containing said macro-header signal and said sequence of compressed data signals; and (f) transmitting the frame of data signals assembled in step (e) over said network to said second site;

at said second site, (g) storing said plurality of header signals;

(h) receiving the frame of data signals transmitted in step (f) containing said macro-header signal and said sequence of compressed data signals; and (i) accessing said plurality of header signals stored in step (g) based upon the macro-header signal contained in the received frame of data signals and processing the contents of said received frame of data signals in accordance with said accessed plurality of header signals, so as to recover said digital data signals at said second site for application to said second user data terminal equipment.

2. A method according to claim 1, wherein step (i) comprises, for each of successive portions of said received frame of data signals, initially examining said stored plurality of header signals in an attempt to locate a respective frame header signals associated therewith, but, in response to not locating a respective frame header signal within said stored plurality, obtaining digitally encoded data signals from said received frame, so as to recover said digital data signals from said received frame.

3. A method according to claim 1, wherein said network communication protocol comprises high level data link control protocol through which said frame of data signals is encapsulated for transmission over said network.

4. A method according to claim 3, wherein said compression mechanism comprises a STAC compression mechanism.

5. A method according to claim 1, wherein step (e) further comprises incorporating a sequence number signal into said frame of data signals to be transmitted over said network.

6. A method according to claim 1, wherein the plurality of header signals stored in step (e) are tagged as macro-header signals.

7. A method according to claim 1, wherein said third header signal comprises a multi-bit code signal respective bit portions of which contain are associated with respectively different precursor information signals employed in step (i) to process the contents of said received frame of data signals to recover said digital data signals at said second site for application to said second user data terminal equipment.

8. A method according to claim 7, wherein said third header signal comprises a multi-bit code signal which includes a bit portion indicating whether the current message is being aborted.

9. A method according to claim 7, wherein said third header signal comprises a multi-bit code signal which includes a bit portion indicating whether the current frame of data signals is the first frame in the message.

10. A method according to claim 7, wherein said third header signal comprises a multi-bit code signal which includes a bit portion indicating whether the current frame of data signals is the last frame in the message.

11. A method according to claim 7, wherein said third header signal comprises a multi-bit code signal which includes a bit portion indicating whether immediately following the third header signals is a sequence number code signal, the contents of which represent the position of the current frame in a sequence of data frames being sent to the receiver.

12. A method according to claim 7, wherein said third header signal comprises a multi-bit code signal which includes a bit portion indicating whether the current frame of data signals contains a data code signal representative of the length of the frame.

13. A method according to claim 7, wherein said third header signal comprises a multi-bit code signal which includes a bit portion indicating whether the frame contains data.

14. A method according to claim 7, wherein said third header signal comprises a multi-bit code signal which includes a bit portion indicating whether the current frame contains frame check sequence signals.

15. A method according to claim 7, wherein said third header signal comprises a multi-bit code signal which includes a bit portion indicating whether immediately following the third header signal is an extension header signal.

16. A method of controlling the recovery of digital data signals at a receiver site, which is connected to a digital communication channel, a transmitter site encoding and transmitting digital data signals as a message over said digital communication channel to said receiver site comprising the steps of:

(a) generating a message containing said frame of digital data signals, which includes a multi-bit control code signal, respective bit portions of which are associated with respectively different attributes of said frame of digital data signals;

(b) transmitting said message containing said frame of digital data signals including said multi-bit control code signals from said transmitter site over said digital communication channel to said receiver site; and (c) at said receiver site, receiving said message containing said frame of digital data signals including said multi-bit control code signals that has been transmitted from said transmitter site over said digital communication channel to said receiver site and employing the contents of said multi-bit control code signal to recover data signals contained within said frame; and wherein said multi-bit control code includes a plurality of the following bit portions: a first bit portion indicating whether the current message is being aborted, a second bit portion whether the current frame is the first frame in the message, a third bit portion indicating whether the current frame is the last frame in the message, a fourth bit portion indicating whether immediately following the multi-bit code signals is a sequence number code signal, the contents of which represent the position of the current frame in a sequence of data frames being sent to the receiver site, a fifth bit portion indicating whether the current frame contains a data code signal representative of the length of the frame, a sixth bit portion indicating whether the current frame contains data, a seventh bit portion indicating whether the current frame contains frame check sequence signals, and an eighth bit portion indicating whether immediately following the multi-code signal is a further multi-bit code signal.

17. A method of transmitting a frame of digital data over a digital communications channel from a first site to a second site comprising the steps of:

(a) specifying a plurality of multi-bit communication control codes, that are normally appended to digital data to be transmitted over said digital communications channel, said control codes being employed at said second site to recover said digital data from a received frame;

(b) generating a multi-bit macro-code as a substitute representation of said plurality of communication control codes;

(c) combining said macro-code and digital data within a respective frame for transmission; and (d) transmitting said respective frame over said communication channel to said second site.

18. A method according to claim 17, wherein said plurality of communication control codes are stored at said second site, and further including the steps of:

(e) receiving said respective frame that has been transmitted over said communication channel to said second site in step (d); and (f) accessing said communication control codes based upon the macro-code signal in the received frame and processing the contents of said received frame in accordance with said communication control codes, so as to recover said digital data from said received frame.

19. A method according to claim 18, wherein step (f) comprises accessing said communication control codes stored at said second site based upon the macro-code contained in the received frame, so as generate a predefined sequence of opcodes and parameters through the processing of which said digital data are recovered.

20. A method according to claim 18, wherein step (f) comprises, for each of successive portions of said received frame, initially examining said communication control codes stored at said second site in an attempt to locate a respective communication control code associated therewith, but, in response to not locating a respective communication control code within those stored at said second site, obtaining digital data from said received frame.

21. A method of transmitting digital information signals over a digital communications channel from a first site to a second site, comprising the steps of:

(a) generating a digital macro-code, which is a substitute representation of a plurality of digital code fields that are respectively associated with a plurality of digital signal processing operations to which said digital information signals to be transmitted from said first site to said second site are subjected, said plurality of digital code fields having an overall effective length in excess of that of said digital macro-code;

(b) subjecting said digital information signals to said plurality of digital signal processing operations; and (c) transmitting a message from said first site to said second site, said message containing said digital macro-code signal generated in step (a) and said digital information signals that have been processed in accordance with said plurality of digital signal processing operations.

22. A method according to claim 21, further comprising the steps of:

at said second site, (d) receiving said message that has been transmitted from said first site to said second site;

(e) using said digital macro-code to identify a plurality of signal recovery operations associated with said plurality of digital signal processing operations carried out on said digital information signals in step (b), subjecting said digital information signals that have been processed in accordance with said plurality of digital signal processing operations at said first site to said associated plurality of signal recovery operations, so as to recover said digital information signals.

23. A method according to claim 22, wherein step (e) comprises storing, in association with said macro-code, a list of entries containing information associated with said plurality of signal recovery operations and, in the course of subjecting said digital information signals, that have been processed in accordance with said plurality of digital signal processing operations at said first site, to a respective signal recovery operation, initially defaulting to said list for the presence of an entry containing information necessary to carry out said respective signal recovery operation.

24. A method according to claim 23, wherein step (e) further comprises, in response to said list not containing an entry containing information necessary to carry out said respective signal recovery operation, deriving said information from the contents of said received message.

25. A method according to claim 23, wherein step (e) further comprises storing with each entry a tag representative of whether or not information necessary for carrying out the next signal recovery operation is present in said listing.

26. A method according to claim 24, wherein said digital macro-code is representative of a prescribed type of digital communication protocol, and one or more signal processing operations and associated parameters therefor.

27. A method according to claim 26, wherein said digital macro-code signal is representative of point-to-point digital communication protocol, and wherein said one or more signal processing operations include digital compression of said digital information signals.

28. A method according to claim 23, wherein step (e) comprises iteratively accessing entries in said listing to derive information associated with said plurality of signal recovery operations and, in the course of subjecting said digital information signals, that have been processed in accordance with said plurality of digital signal processing operations at said first site, to a respective signal recovery operation, initially defaulting to said list for the presence of an entry containing information necessary to carry out said respective signal recovery operation.

29. A method of transmitting a plurality of multi-bit digital data words over a digital communications channel from a first site to a second site and recovering said digitally encoded information signals at said second site comprising the steps of:

at said first site, (a) generating a multi-bit digital macro-code, which is a substitute representation of a plurality of multi-bit digital code fields that are respectively associated with a plurality of digital signal processing operations to which said multi-bit digital data words to be transmitted from said first site to said second site are subjected, said plurality of digital code fields having an overall effective length in excess of that of said multi-bit digital macro-code;

(b) subjecting said plurality of multi-bit digital data words to said plurality of digital signal processing operations, and combining the resultant processed plurality of multi-bit digital data words with said multi-bit digital macro-code generated in step (a) in to a frame of digital data;

(c) transmitting said frame of digital data message from said first site to said second site;

at said second site, (d) storing, in association with said multi-bit macro-code word, a list of entries containing information associated with a plurality of signal recovery operations associated with said plurality of signal processing operations;

(e) receiving said frame of digital data that has been transmitted thereto from said first site; and (f) processing said frame of digital data in accordance with said list of entries containing information associated with said plurality of signal recovery operations, so as to recover said multi-bit digital data words.

30. A method according to claim 29, wherein step (f) further comprises, in the course of subjecting contents of said frame of digital data to a respective signal recovery operation, initially defaulting to said list for the presence of an entry containing information necessary to carry out said respective signal recovery operation.

31. A method according to claim 30, wherein step (f) further comprises, in response to said list not containing an entry containing information necessary to carry out said respective signal recovery operation, deriving said information from the contents of said received message.

32. A method according to claim 29, wherein said multi-bit digital macro-code is representative of a prescribed type of digital communication protocol and one or more signal processing operations and associated parameters therefor.

33. A method according to claim 29, wherein step (f) comprises iteratively accessing entries in said list to derive information associated with said plurality of signal recovery operations.

* * * * *